United States Patent
Vänttilä et al.

(10) Patent No.: US 9,144,201 B2
(45) Date of Patent: Sep. 29, 2015

(54) CUTTING TOOL

(71) Applicant: Fiskars Brands Finland Oy Ab, Billnäs (FI)

(72) Inventors: Olli-Pekka Vänttilä, Lohja (FI); Sami Lyytikäinen, Lohja (FI)

(73) Assignee: Fiskars Brands Finland Oy Ab, Billnas (FI)

( * ) Notice: Subject to any disclaimer, the term of this patent is extended or adjusted under 35 U.S.C. 154(b) by 185 days.

(21) Appl. No.: 14/090,981

(22) Filed: Nov. 26, 2013

(65) Prior Publication Data

US 2014/0182142 A1   Jul. 3, 2014

(30) Foreign Application Priority Data

Dec. 3, 2012   (FI) ...................................... 20126261

(51) Int. Cl.
*A01G 3/02* (2006.01)
*B26B 13/16* (2006.01)
*B26B 13/18* (2006.01)
*B26B 13/00* (2006.01)

(52) U.S. Cl.
CPC *A01G 3/021* (2013.01); *A01G 3/02* (2013.01); *B26B 13/16* (2013.01); *B26B 13/18* (2013.01); *A01G 2003/023* (2013.01); *B26B 13/00* (2013.01)

(58) Field of Classification Search
CPC ... A01G 3/02; A01G 3/021; A01G 2003/023; A01G 3/025; A01G 3/0255; A01G 3/06; B26B 13/00; B26B 13/16; B26B 13/18; B26B 17/00; B26B 17/02; Y10T 83/87
See application file for complete search history.

(56) References Cited

U.S. PATENT DOCUMENTS 466,879 A * 1/1892 Dixon ............................. 30/239
953,365 A * 3/1910 Wheeler ......................... 30/239
(Continued)

FOREIGN PATENT DOCUMENTS

CH       229803 A    * 11/1943
DE     196 52 389       3/1998
(Continued)

OTHER PUBLICATIONS

European Search Report for EP Application No. 13192300, dated Feb. 27, 2014, 2 pages.
National Board of Patents and Registration of Finland Search Report for Finland Application No. 20126261, dated Aug. 29, 2013, 1 page.

*Primary Examiner* — Kenneth E. Peterson
*Assistant Examiner* — Jennifer Swinney
(74) *Attorney, Agent, or Firm* — Foley & Lardner LLP

(57) ABSTRACT

A cutting tool includes a first and a second element having a handle in a first end and a cutting element in a second end. A spring element is arranged between the first and second element to move the handles away from each other, and an adjustment mechanism sets a maximum opening angle for the handles. The adjustment mechanism includes a groove in a side surface of the first element, an adjustment ring is arranged to a side surface of the second element, and a shaft which is rotatably arranged to protrude through a hole in the second element, a first end of the shaft engaging the engagement surface of the adjustment ring and a second end of the shaft having an eccentric part protruding into the groove in the first element.

5 Claims, 2 Drawing Sheets

(56) References Cited

U.S. PATENT DOCUMENTS

| | | | |
|---|---|---|---|
| 2,816,359 A * | 12/1957 | Hogue et al. | 30/239 |
| 3,336,668 A * | 8/1967 | Groom | 30/239 |
| 4,779,342 A * | 10/1988 | Kobayashi et al. | 30/250 |
| 5,787,589 A * | 8/1998 | Auderset | 30/261 |
| 6,418,626 B1 | 7/2002 | Jang | |
| 6,938,346 B1 * | 9/2005 | Huang | 30/250 |
| 7,681,318 B2 * | 3/2010 | Hsieh | 30/244 |
| 2007/0266568 A1 | 11/2007 | Lin | |
| 2008/0115368 A1 | 5/2008 | Shan | |
| 2013/0042486 A1 * | 2/2013 | Lee | 30/249 |

FOREIGN PATENT DOCUMENTS

| | | |
|---|---|---|
| DE | 1020050 52 970 | 8/2006 |
| DE | 102010000558 | 8/2011 |
| DE | 2020110 51 665 | 1/2012 |
| DE | 102010037967 A1 * | 4/2012 |
| EP | 2 253 200 | 11/2010 |
| FR | 1227344 * | 8/1960 |
| GB | 916411 | 1/1963 |
| GB | 2270489 A * | 3/1994 |

* cited by examiner

CUTTING TOOL

CROSS REFERENCE TO RELATED APPLICATIONS

This Application claims the benefit of priority to Finnish patent application No. 20126261, which was filed on Dec. 3, 2012, the complete disclosure of which is incorporated by reference herein.

BACKGROUND OF THE INVENTION

1. Field of the Invention

This invention relates to a cutting tool, and more particularly to a solution for adjusting a maximum opening angle of the handles of a cutting tool.

2. Description of Prior Art

Previously there is known a cutting tool including a first and second element having a handle in a first end and a cutting element in a second end. The first and second elements are rotatably joined by a pivot such that when the handles are moved towards each other, also the cutting elements move towards each other in order to cut an object between the cutting elements.

In order to make it easier for the user to use the cutting tool, a spring is arranged between the first and second element to press the handles away from each other. Therefore once the user has pushed the handles towards each other to perform a cut, and then releases the handles, the spring pushes the handles apart from each other until they reach a maximum opening angle.

As a cutting tool may be utilized to cut objects of various sizes, it is advantageous to utilize an adjustment mechanism that allows the user to adjust the maximum opening angle. Such previously known mechanisms, however, require a lot of space in the cutting tool. Additionally, they are not very reliable.

SUMMARY OF THE INVENTION

An object of the present invention is to solve the above mentioned drawbacks and to provide a cutting tool having an improved adjustment mechanism. This object is achieved with a cutting mechanism as define in independent claim 1.

BRIEF DESCRIPTION OF DRAWINGS

In the following the present invention will be described in closer detail by way of example and with reference to the attached drawings, in which.

DESCRIPTION OF AT LEAST ONE EMBODIMENT

The cutting tool illustrated in FIGS. 1 to 4 may be a garden pruner, such as a cutting tool which is used for performing scissor like cutting actions on plants and trees, for instance.

Figure 1:
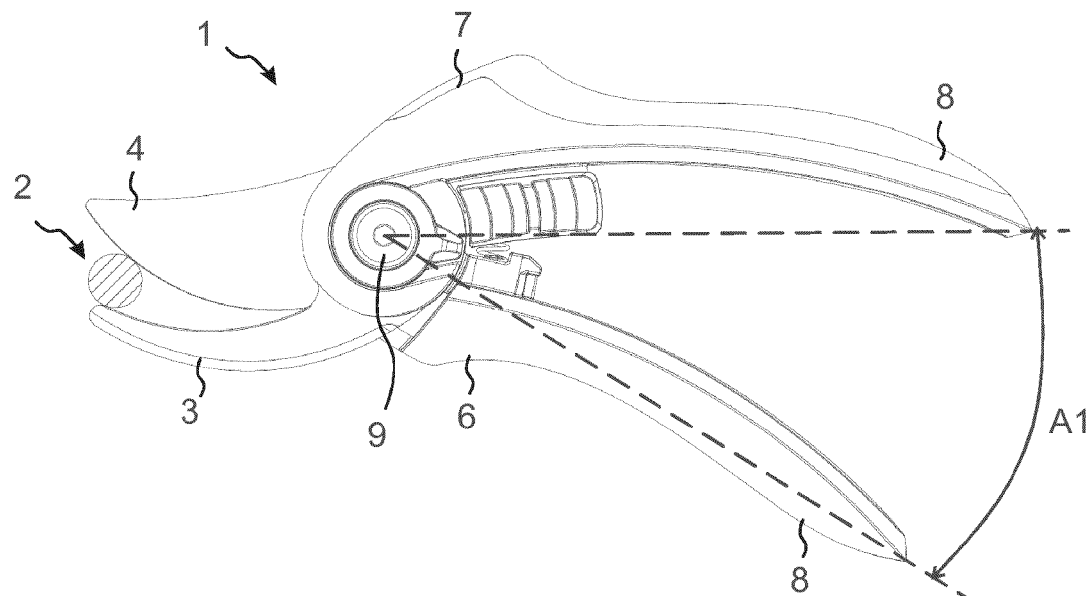
FIGS. 1 and 2 illustrate a cutting tool at different opening angles.
Figure 2:
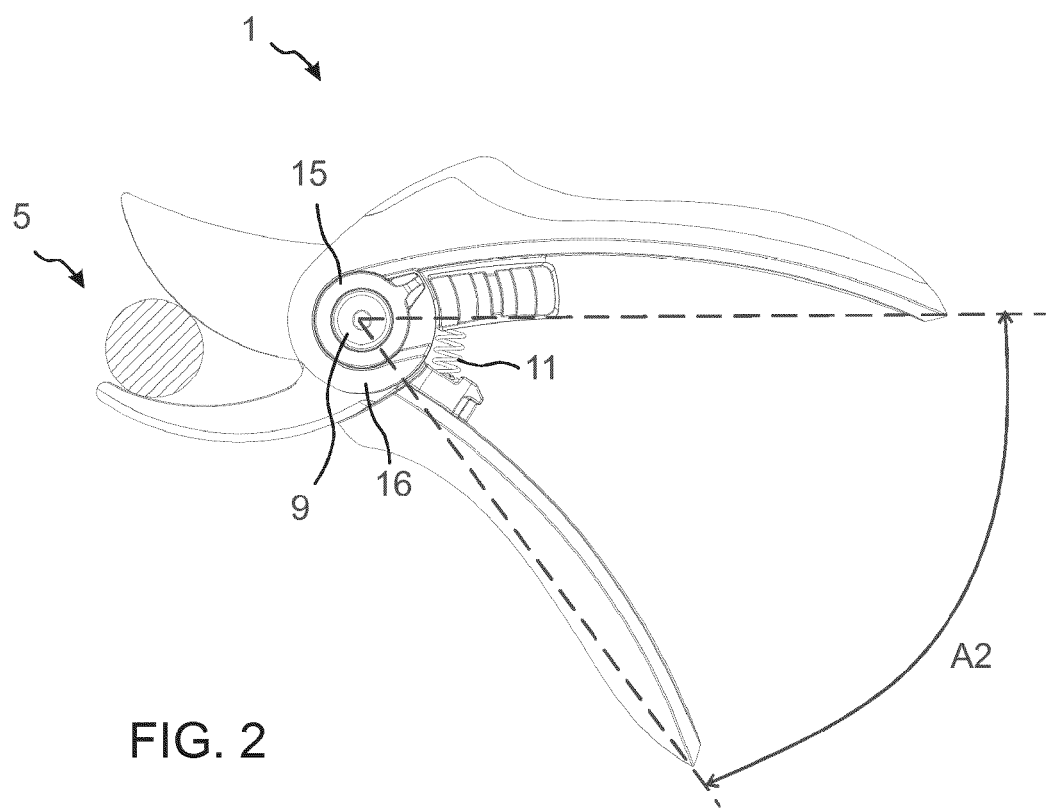

FIG. 1 illustrates cutting of an object 2 having a small diameter with the cutting tool 1. Due to the small diameter of the object, it is sufficient that the maximum opening angle A1 of the handles 8 is relatively small. Correspondingly, also the opening angle between the cutting elements 3 and 4 is then small. In FIG. 2 the same cutting tool 1 is used for cutting an object 5 having a larger diameter than the object 2. Therefore the opening angle of the cutting tool 1 has been adjusted, such that the handles can reach a maximum opening angle A2 which is larger than the opening angle A1.

Figure 3:
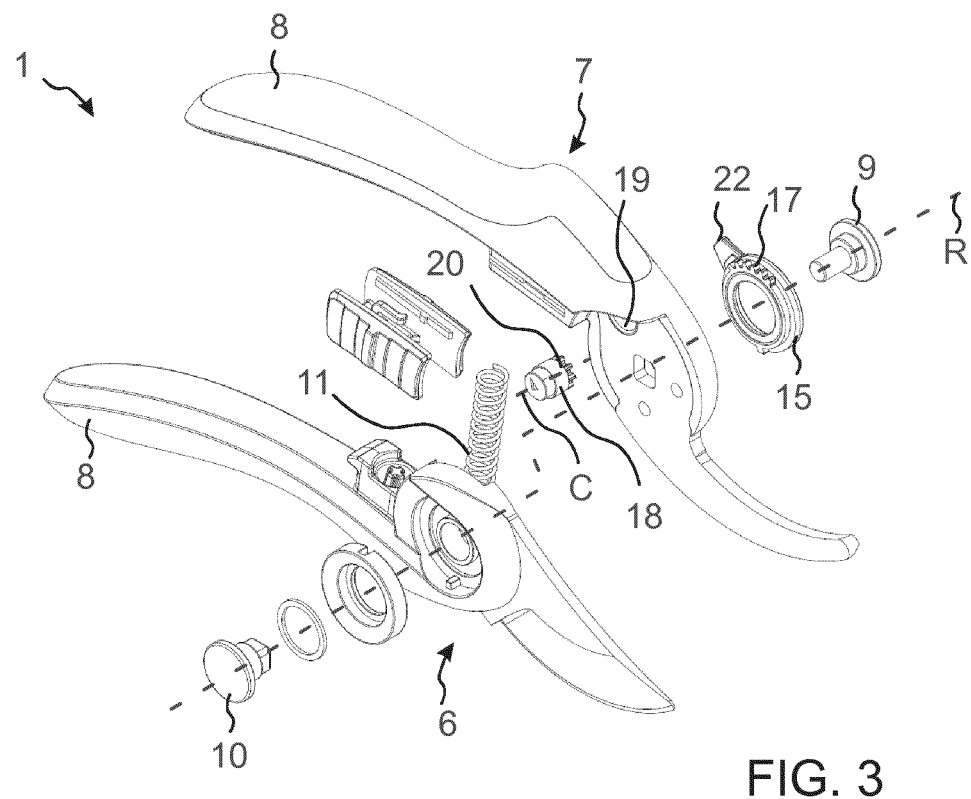
FIGS. 3 and 4 are exploded views of the cutting tool of FIG. 1.
Figure 4:
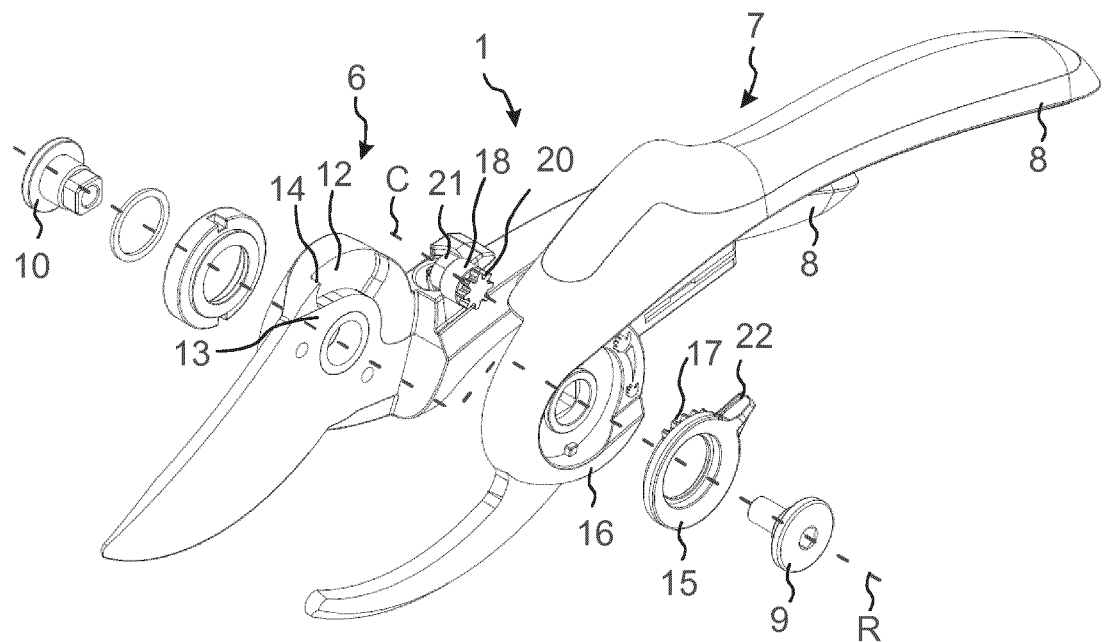

The cutting tool 1 and the adjustment mechanism for adjusting the maximum opening angle A1, A2 of the cutting tool 1 is illustrated in more detail in FIGS. 3 and 4.

The cutting tool comprises a first element 6 and a second element 7 having a handle 8 in a first end and a cutting element 3 and 4 in a second end. The handles may be manufactured of a suitable plastic material, and the cutting elements 3 and 4 may be manufactured of steel, for instance. Alternatively one or both of the first and second elements 3 and 4 may be manufactured in one piece only, such as in one single piece of steel that has been shaped in a suitable way to obtain the handle and the cutting element.

The cutting tool may be implemented as an anvil pruner having one flat cutting element to which the other cutting element closes, as bypass secateurs having two cutting elements passing each other to perform a cut, or as parrot-break secateurs having two concave passing cutting elements which trap the object to cut between them, for instance. Consequently, both cutting elements must not necessarily have a sharp cutting edge.

The first 6 and second 7 elements are rotatably joined to each other by a pivot, which in the illustrated example is implemented with a screw 9 and nut 10 combination. Consequently, while the user pushes the handles 8 towards each other, also the cutting elements 3 and 4 move towards each other. A spring element 11 is arranged between the first 6 and second 7 element to press the handles 8 away from each other once the user releases the handles 8 after having performed a cutting action. The maximum distance that the spring element 11 may move the handles away from each other depends on a maximum opening angle A1 or A2 set by the user via an adjustment mechanism.

In the illustrated embodiment the adjustment mechanism comprises a groove 12 in a side surface 13 of the first element 6 which faces the second element 7. The groove 12 has a stop edge 14, which in the illustrated example extends in a direction practically perpendicular to the direction of the side surface 13.

An adjustment ring 15 is arranged to a side surface 16 of the second element 7 which faces away from the first element 6. The adjustment ring 15 has an engagement surface 17 and it is rotatably arranged to the side surface 16 such that it can be rotated around an axis R of rotation of the pivot. Rotation of the adjustment ring 15 allows the user to set the maximum opening angle A1, A2 for the handles 8.

A shaft 18 is rotatably arranged to protrude through a hole 19 in the second element 7. A first end 20 of the shaft engages the engagement surface 17 of the adjustment ring 15 for rotating the shaft around a longitudinal center axis C of the shaft 18 when the adjustment ring 15 is rotated. A second end of the shaft has an eccentric part 21 protruding into the groove 12 in the first element 6. Once the eccentric part 21 comes into contact with the stop edge 14, the maximum opening angle A1, A2 for the handles 8 has been reached and the contact between the eccentric part 21 and the stop edge 14 prevents the spring element 11 from pushing the handles further away from each other.

The eccentric part 21 may be implemented as an element having a cross section which is round, possibly circular and with a center point of the cross section located away from the longitudinal center axis C of the shaft. The shape is, however, not important as long as turning of the shaft 18 results in contact occurring between the eccentric part 21 and the stop edge 14 at different opening angles of the handles.

In the illustrated embodiment, the engagement surface 17 of the adjustment ring 15 is a toothed surface and the first end 20 of the shaft 18 engaging the engagement surface 17 has a corresponding toothed surface. In this way sliding between the adjustment ring 15 and the shaft 18 can be efficiently prevented.

From the figures it can be seen that the eccentric part 21 of the shaft 18 and the groove 12 are hidden in a space between the first 6 and second 7 elements. Additionally, the first end 20 of the shaft is hidden in a space between the adjustment ring 15 and the side surface 16 of the second element 7. In this way these parts are efficiently protected from external obstacles that otherwise might come into contact with them and cause malfunctions due to jamming one or more of these elements. The illustrated cutting tool is therefore well protected against external dirt and objects that may be present in a dirty environment where the cutting tool is used.

The adjustment ring 15 has a diameter which is substantially larger that the diameter of the shaft 18. Due to such a design it is efficiently prevented that the shaft would be able to rotate the adjustment ring by accident during use to the cutting tool. Instead the adjustment ring efficiently remains in the position to which the user has turned it. In order to facilitate easy adjustment, the adjustment ring 15 may be provided with a protruding knob 22.

The adjustment mechanism implemented as illustrated in FIGS. 1 to 4 is relatively small in size and therefore does not require much space in the cutting tool. This is an advantage as it makes it possible to design a small and efficient cutting tool. A small size can be obtained as the adjustment ring 15 is arranged to be rotated around the axis R of rotation of the pivot. In this way a large diameter can be provided to the adjustment ring while keeping the distance it needs to protrude from the rotation axis of the pivot as small as possible. The result is a compact cutting tool.

It is to be understood that the above description and the accompanying figures are only intended to illustrate the present invention. It will be obvious to a person skilled in the art that the invention can be varied and modified without departing from the scope of the invention.

The invention claimed is:

1. A cutting tool, comprising
    a first and a second element having a handle in a first end and a cutting element in a second end, the first and the second element being rotatably joined by a pivot such that when the handles are moved towards each other, also the cutting elements move towards each other,
    a spring element arranged between the first and second element to move the handles away from each other, and
    an adjustment mechanism for setting a maximum opening angle for the handles, at which opening angle the spring element cannot move the handles further away from each other, the adjustment mechanism comprising:
    a groove in a side surface of the first element which faces the second element, the groove having a stop edge,
    an adjustment ring arranged to a side surface of the second element which faces away from the first element, the adjustment ring having an engagement surface and being rotatable around an axis of rotation of the pivot for allowing a user to set the maximum opening angle for the handles, and
    a shaft which is rotatably arranged to protrude through a hole in the second element, a first end of the shaft engaging the engagement surface of the adjustment ring for rotating the shaft around a longitudinal center axis of the shaft when the adjustment ring is rotated, a second end of the shaft having an eccentric part protruding into the groove in the first element such that the eccentric part comes into contact with the stop edge once the maximum opening angle for the handles is reached.

2. A cutting tool according to claim 1, wherein the engagement surface of the adjustment ring is a toothed engagement surface, and that the first end of the shaft engaging the engagement surface has a corresponding toothed surface.

3. A cutting tool according to claim 1, wherein the eccentric part of the shaft and the groove are hidden in a space between the first and second elements, and that the first end of the shaft is hidden in a space between the adjustment ring and the side surface of the second element.

4. A cutting tool according to claim 1, wherein the adjustment ring is provided with a knob for rotating the adjustment ring and the shaft, and for turning the eccentric part of the shaft into a position where the eccentric part comes into contact with the stop edge at a new maximum opening angle.

5. A cutting tool according to claim 1, wherein the adjustment ring has a diameter which is substantially larger than a diameter of the first end of the shaft.

* * * * *